United States Patent
Choi

(10) Patent No.: US 9,821,676 B2
(45) Date of Patent: Nov. 21, 2017

(54) ELECTRIC VEHICLE CHARGING APPARATUS HAVING A WELDING MONITORING RELAY THAT IS OPENED AND CLOSED DURING CHARGING OPERATIONS

(71) Applicant: LSIS CO., LTD., Anyang-si, Gyeonggi-do (KR)

(72) Inventor: Seung Woo Choi, Suwon-si (KR)

(73) Assignee: LSIS CO., LTD., Anyang-si (KR)

( * ) Notice: Subject to any disclaimer, the term of this patent is extended or adjusted under 35 U.S.C. 154(b) by 157 days.

(21) Appl. No.: 14/794,210

(22) Filed: Jul. 8, 2015

(65) Prior Publication Data

US 2016/0075251 A1 Mar. 17, 2016

(30) Foreign Application Priority Data

Sep. 15, 2014 (KR) .................. 10-2014-0121998

(51) Int. Cl.
  *H01M 10/46* (2006.01)
  *B60L 11/18* (2006.01)
  *H01H 47/00* (2006.01)

(52) U.S. Cl.
  CPC ....... *B60L 11/1848* (2013.01); *B60L 11/1818* (2013.01); *H01H 47/002* (2013.01); *H01H 47/004* (2013.01); *Y02T 10/7005* (2013.01); *Y02T 10/7072* (2013.01); *Y02T 90/14* (2013.01)

(58) Field of Classification Search
  CPC .............................. H02J 7/0029; H02J 7/0031
  USPC .......................................... 320/104, 111, 109
  See application file for complete search history.

(56) References Cited

U.S. PATENT DOCUMENTS

| | | | | |
|---|---|---|---|---|
| 7,292,418 | B2 * | 11/2007 | Egner | H02H 3/33 361/42 |
| 8,363,364 | B2 * | 1/2013 | Watanabe | B60L 3/0069 361/42 |
| 2006/0021098 | A1 * | 1/2006 | Tezuka | H01H 47/002 477/7 |
| 2009/0115251 | A1 | 5/2009 | Nakamura et al. | |

(Continued)

FOREIGN PATENT DOCUMENTS

| | | |
|---|---|---|
| CN | 101312847 | 11/2008 |
| CN | 102074979 | 5/2011 |

(Continued)

OTHER PUBLICATIONS

European Patent Office Application Serial No. 15177604.4, Search Report dated Feb. 8, 2016, 6 pages.

(Continued)

*Primary Examiner* — Edward Tso
(74) *Attorney, Agent, or Firm* — Lee Hong Degerman Kang & Waimey

(57) ABSTRACT

A charging device includes: a plurality of main relays forming a connection between an electric vehicle (EV)-side connector and an outlet-side connector; a relay welding sensing unit connected to the plurality of relays to sense the presence or absence of welding of the plurality of relays; a welding monitoring relay opening and closing between the relay welding sensing unit side node and a main relay side node; and a control unit controlling the open and close of the welding monitoring relay.

6 Claims, 15 Drawing Sheets

(56) References Cited

U.S. PATENT DOCUMENTS

| | | | | |
|---|---|---|---|---|
| 2010/0033140 A1* | 2/2010 | Otake | ................... | B60L 3/04 320/165 |
| 2010/0194354 A1* | 8/2010 | Gotou | ................... | B60L 3/003 320/163 |
| 2011/0121780 A1 | 5/2011 | Fukuo et al. | | |
| 2011/0122536 A1 | 5/2011 | Watanabe et al. | | |
| 2013/0009598 A1* | 1/2013 | Ohtomo | ................ | H02J 7/0031 320/109 |

FOREIGN PATENT DOCUMENTS

| | | |
|---|---|---|
| CN | 202759276 | 2/2013 |
| CN | 103236733 | 8/2013 |
| JP | 2000173428 | 6/2000 |
| JP | 2011109872 | 6/2011 |
| JP | 2012161150 | 8/2012 |
| JP | 2013005528 | 1/2013 |
| JP | 2014103847 | 6/2014 |
| JP | 2014138498 | 7/2014 |
| JP | 2015180182 | 10/2015 |
| KR | 100432285 | 5/2004 |
| WO | 2013073034 | 5/2013 |

OTHER PUBLICATIONS

Japan Patent Office Application Serial No. 2015-148345, Office Action dated Jul. 26, 2016, 4 pages.
Korean Intellectual Property Office Application No. 10-2014-0121998, Office Action dated Jun. 21, 2017, 4 pages.
The State Intellectual Property Office of the People's Republic of China Application No. 201510583829.3, Office Action dated Jun. 16, 2017, 6 pages.

\* cited by examiner

ELECTRIC VEHICLE CHARGING APPARATUS HAVING A WELDING MONITORING RELAY THAT IS OPENED AND CLOSED DURING CHARGING OPERATIONS

CROSS-REFERENCE TO RELATED APPLICATIONS

Pursuant to 35 U.S.C. §119(a), this application claims the benefit of earlier filing date and right of priority to Korean Patent Application No. 10-2014-0121998, filed on Sep. 15, 2014, the contents of which are hereby incorporated by reference herein in its entirety.

BACKGROUND

The present disclosure relates to the charge of an electric vehicle.

Electric vehicles mean vehicles operating by using electricity and may be roughly divided into a battery-powered electric vehicle (EV) and a hybrid electric vehicle (HEV). The battery-powered EV is a vehicle running by using only electricity without using fossil fuel and is generally named as an EV. In addition, the HEV means a vehicle running by using electricity and fossil fuel. In addition, the EV includes a battery supplying electricity for running. In particular, the battery-powered EV and a plug-in type HEV uses power supplied from an external power supply to charge a battery and uses power charged in the battery to operate an electric motor.

In general, a relay is being used in order to control power supply from a high-voltage battery pack to a motor.

For example, the EV or the hybrid vehicle includes the relay installed between the battery pack and a high-voltage circuit part in order to control power supply from the high-voltage battery pack to the high-voltage circuit part. In addition, the connection or disconnection between the high-voltage circuit part and the battery pack is performed by the relay according to a vehicle control state.

In this example, the reason why the relay is used is to ensure electric complete insulation between an energy storage medium and other systems, in which case electric stability is ensured because the relay is shorted and power is supplied when a vehicle is in operation, and the relay is open in a key off, maintenance or emergency state. Also, when a first accident occurs, an electric shock resulting from a high voltage or a second accident that is serious, such as fire is prevented, and dark current from the battery pack is blocked.

Therefore, when the relay has welding due to an overcurrent, an abnormal current flows in a battery system and thus a dangerous situation occurs.

As an example, in the case of the hybrid vehicle, the back electromotive force of a motor is generated according to engine RPM when a motor controller goes wrong, so a situation in which a battery is over-charged occurs. In this case, when the battery is over-charged, a battery control unit opens the relay in order to protect the battery but when the relay is welded for other reasons despite an open command by the control unit, there is a possibility that fires occurs or a vehicle explodes due to continuous over-charge.

Thus, it is important for safety to detect whether there is welding on relays connected to the battery pack in battery systems for various electric vehicles HEV, PHEV, and EV or an energy storage system (ESS).

SUMMARY

Embodiments provide an apparatus and method for preventing power from being unnecessarily consumed, differently for a charge state in which there is no need to determine welding and a non-charge state in which there is a need to determine the presence or absence of welding, in determining whether a main relay connected in parallel on the same path among relays in a battery pack has been welded.

In one embodiment, a charging device includes: a plurality of main relays forming a connection between an electric vehicle (EV)-side connector and an outlet-side connector; a relay welding sensing unit connected to the plurality of relays to sense the presence or absence of welding of the plurality of relays; a welding monitoring relay opening and closing between the relay welding sensing unit side node and a main relay side node; and a control unit controlling the open and close of the welding monitoring relay.

The control unit may control the open and close of the welding monitoring relay according to whether the charge of the EV is completed.

The control unit may open the welding monitoring relay during the charge of the EV, and close the welding monitoring relay when the charging is ended.

The control unit may determine that the main relay has welding, if it is sensed that the charge of the EV is ended but the main relay is still closed.

The relay welding sensing unit may determine whether the main relay has welding, based on the amount of current passing through the relay welding sensing unit.

The relay welding sensing unit may determine whether the main relay has welding, based on the amount of current passing through the relay welding sensing unit in a normal state.

The relay welding sensing unit may include a photo coupler.

The photo coupler may include a light emission unit emitting light when current flows, and a light reception unit receiving light from the light emission unit to change the received light to an electrical signal.

The relay welding sensing unit may cross a main path connected to the front and rear ends of the main relay to be connected thereto.

An end of the welding monitoring relay may be connected to the front end of the main relay, and another end of the welding monitoring relay may be connected to the relay welding sensing unit.

The details of one or more embodiments are set forth in the accompanying drawings and the description below. Other features will be apparent from the description and drawings, and from the claims.

DETAILED DESCRIPTION OF THE EMBODIMENTS

Some embodiments are described below in more detail with reference to the accompanying drawings. Since the suffixes "module" and "unit" for components used in the following description are given and interchanged for easiness in making the present disclosure, they do not have distinct meanings or functions.

Mobile terminals described in the present disclosure may include cellular phones, smart phones, laptop computers, digital broadcasting terminals, personal digital assistants (PDAs), portable multimedia players (PMPs), and navigation devices. However, a person skilled in the art may easily appreciate that a configuration according to an embodiment described herein may be applied not only to the mobile terminal but also to a fixed terminal, such as a digital TV, desktop computer, and so on.

In the following, a first embodiment of a charging system for an electric vehicle (EV) according to the present disclosure is described in more detail with reference to the accompanying drawings.

Figure 1:
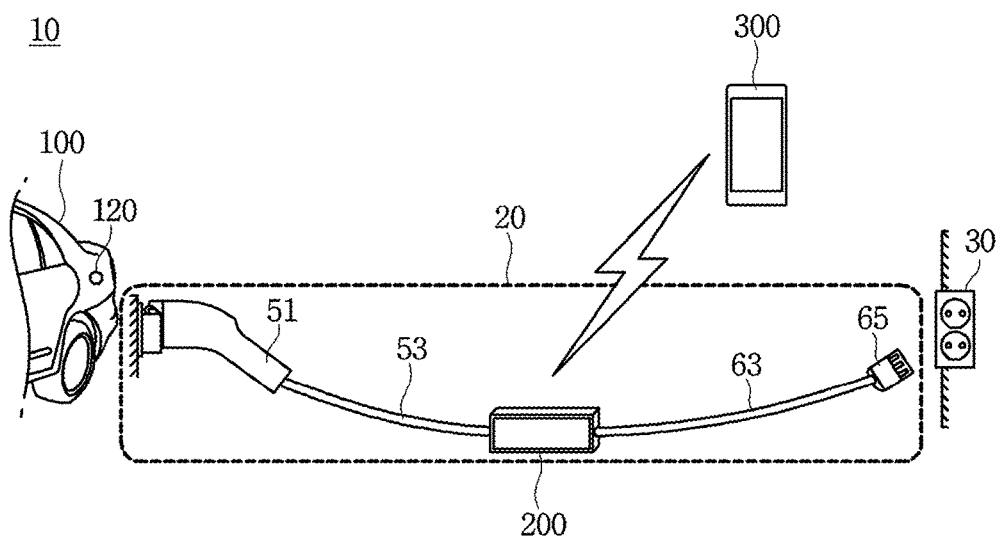
FIG. 1 is a conceptual view of a charging system for an electric vehicle (EV} according to an embodiment.

FIG. 1 is a conceptual view of a charging system for an EV according to an embodiment.

Referring to FIG. 1, an EV charging system 10 according to an embodiment includes an EV 100, an EV charge cable assembly 20, a socket 30, and a terminal device 300.

The socket 30 supplies alternating current (AC) power supplied from a grid.

The EV 100 is connected to the socket 30 through the EV charge cable assembly 20 to receive the AC power from the socket 30.

The EV charge cable assembly 20 transmits the AC power from the socket 30 to the EV 100.

The for the EV charge cable assembly 20 includes a cable-use charge control device 200, an EV connector 51, an EV-side power cable 53, a plug 65, and a grid-side power cable 63.

The EV-side power cable 53 and the grid-side power cable 63 transmit power.

The EV connector 51 may be inserted into an EV inlet 120 to be coupled to thereto and conform to the SAE J1772 standard.

The plug 65 is inserted into the socket to be coupled thereto.

The cable-use charge control device 200 monitors the charge of the EV 100, provides charge related information obtained from the monitoring, to the terminal device 300 and controls the charge of the EV 100.

In an embodiment, the cable-use charge control device 200 is integrally attached to the power cable 53 so that it is not easily decoupled from the EV-side power cable 53 by a user, and has characteristics resistant to external temperature, external humidity, vibration and shock.

In an embodiment, the cable-use charge control device 200 may include a connector to be capable of being coupled to and decoupled from the EV-side power cable 53 by a user. In this case, the connector needs to have characteristics resistant to external temperature, external humidity, vibration and shock.

In an embodiment, the cable-use charge control device 200 is integrally attached to the power cable 63 so that it is not easily decoupled from the EV-side power cable 63 by a user, and has characteristics resistant to external temperature, external humidity, vibration and shock.

In an embodiment, the cable-use charge control device 200 may include a connector to be capable of being coupled to and decoupled from the EV-side power cable 63 by a user. In this case, the connector needs to have characteristics resistant to external temperature, external humidity, vibration and shock.

When the cable-use charge control device 200 includes a connector for wired communication, it may be vulnerable to external conditions because the connector includes a metal terminal. In order to solve such a limitation, the cable-use charge control device 200 may transmit charge related information to the terminal device 300 wirelessly.

The terminal device 300 performs contactless, wireless communication with the EV charge cable assembly 20 and displays information on the EV charge cable assembly 20.

Figure 2:
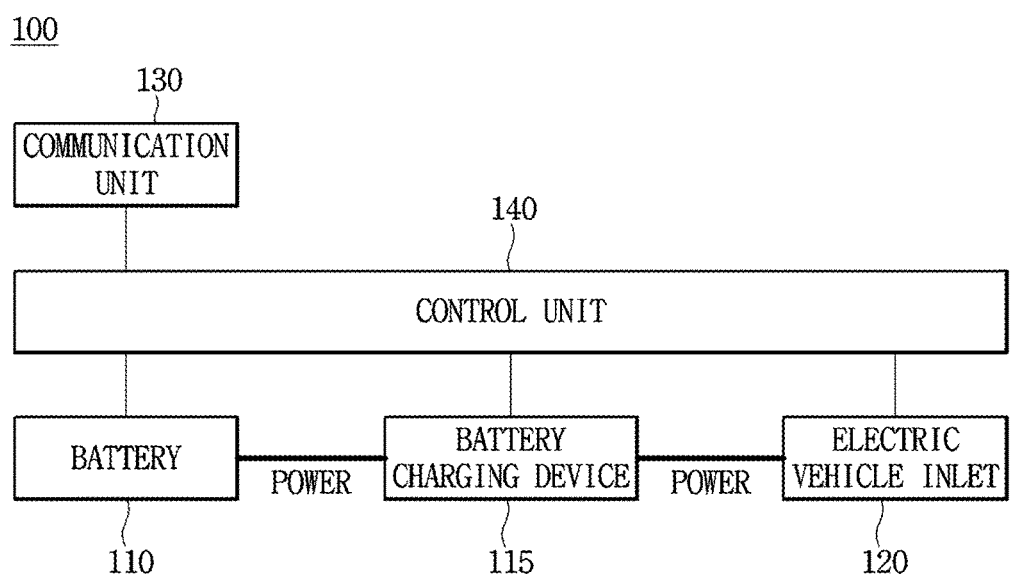
FIG. 2 is a block diagram of an electric device according to an embodiment.

FIG. 2 is a block diagram of an electronic device according to an embodiment.

An EV 100 includes a battery 110, a battery charging device 115, an EV inlet 120, a communication unit 130, and a control unit 140.

The battery 110 supplies power for the operation of the EV 100 to the EV 100.

The EV inlet 120 is a connector for externally receiving power for the charge of the battery 110. The EV inlet 120 may conform on the SAE J1772 standard.

The battery charging device 115 uses power supplied through the EV inlet 120 to charge the battery 110.

The communication unit 130 may communicate with the EV charge cable assembly 20 or the terminal device 300.

The control unit 140 controls the overall operations of the EV 100.

Figure 3:
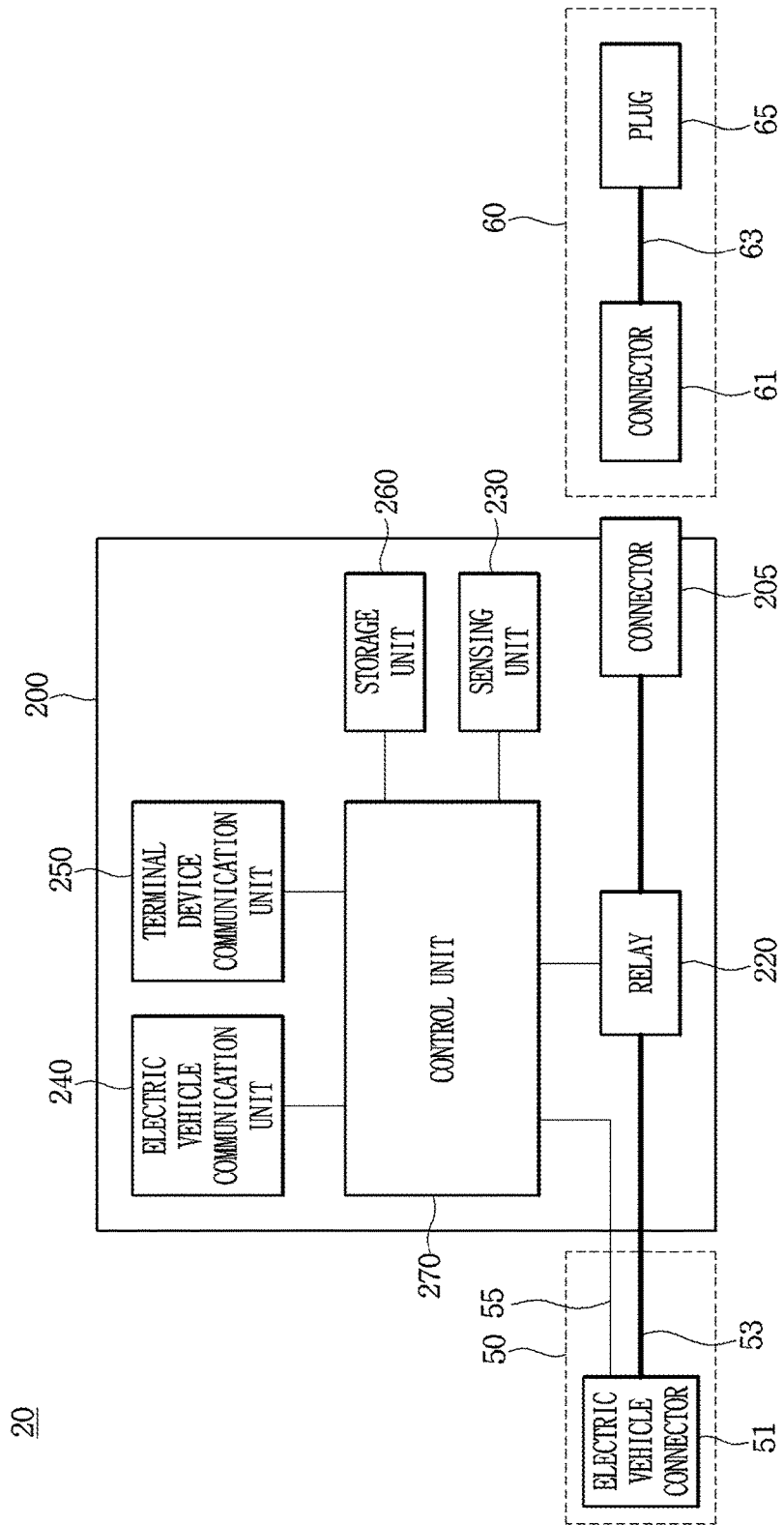
FIG. 3 is a block diagram of an EV charge cable assembly according to an embodiment.

FIG. 3 is a block diagram of an EV charge cable assembly according to an embodiment.

The EV charge cable assembly 20 includes a cable-use charge control device 200, an EV-side power cable assembly 50, and a grid-side power cable assembly 60.

In the following, the EV-side power cable assembly 50 and the grid-side power cable assembly 60 is also referred to as a sub cable assembly.

The EV-side power cable assembly 50 includes an EV connector 51, an EV-side power cable 53, and an EV-side data communication cable 55.

The grid-side power cable assembly 60 includes a connector 61, a grid-side power cable 63, and a plug 65.

The cable-use charge control device 200 includes a connector 205, at least one relay 220, a sensing unit 230, an EV communication unit 240, a terminal device communication unit 250, a storage unit 260 and a control unit 270.

The connector 205 is coupled to the connector 61. The connector 205 supports coupling to and decoupling from the connector 61. That is, the connector 205 may be coupled to and decoupled from the connector 61.

The at least one relay 220 controls the connection between the EV-side power cable 53 and the grid-side power cable 63. In particular, when the at least one relay 220 is turned off, it breaks the connection between the EV-side power cable 53 and the grid-side power cable 63. When the at least one relay 220 is turned on, it electrically connects the EV-side power cable 53 and the grid-side power cable 63.

The sensing unit 230 senses EV charge related information as will be described below. In particular, the sensing unit 230 may also sense both information on the EV 100 and information on the EV charge cable assembly 20. The sensing unit 230 may also sense information on the EV charge cable assembly 20, and not information on the EV 100.

The EV communication unit 240 performs communication with the EV 100. In particular, the EV communication unit 240 performs communication with the communication unit 130 in the EV 100. The EV communication unit 240 and the communication unit 130 may use a power cable communication method to perform communication through the power cable 53. Also, the EV communication unit 240 and the communication unit 130 may also use an Infrared Data Association (IrDA) communication technology, a Radio Frequency communication technology, Bluetooth, Ultra Wideband (UWB), ZigBee, Digital Living Network Alliance (DLNA), and so on to perform communication.

The terminal device communication unit 250 performs communication with the terminal device 300. In particular, the terminal device communication unit 250 performs communication with a communication unit 310 in the terminal device 300. In particular, the terminal device communication unit 250 and the communication unit 310 may also use an Infrared Data Association (IrDA) communication technology, a Radio Frequency communication technology, Bluetooth, Ultra Wideband (UWB), ZigBee, Digital Living Network Alliance (DLNA), and so on to perform communication.

The storage unit 260 stores pieces of information to be described below. In particular, the storage unit 260 may store EV charge related information. The storage unit 260 may store information on the usage history of the cable-use charge control device 210. For example, the storage unit 260 may store information on the last usage time and time length and accumulated usage time length of the cable-use charge control device 210.

The control unit 270 controls the overall operations of the cable-use charge control device 200, including operations to be described below.

Figure 4:
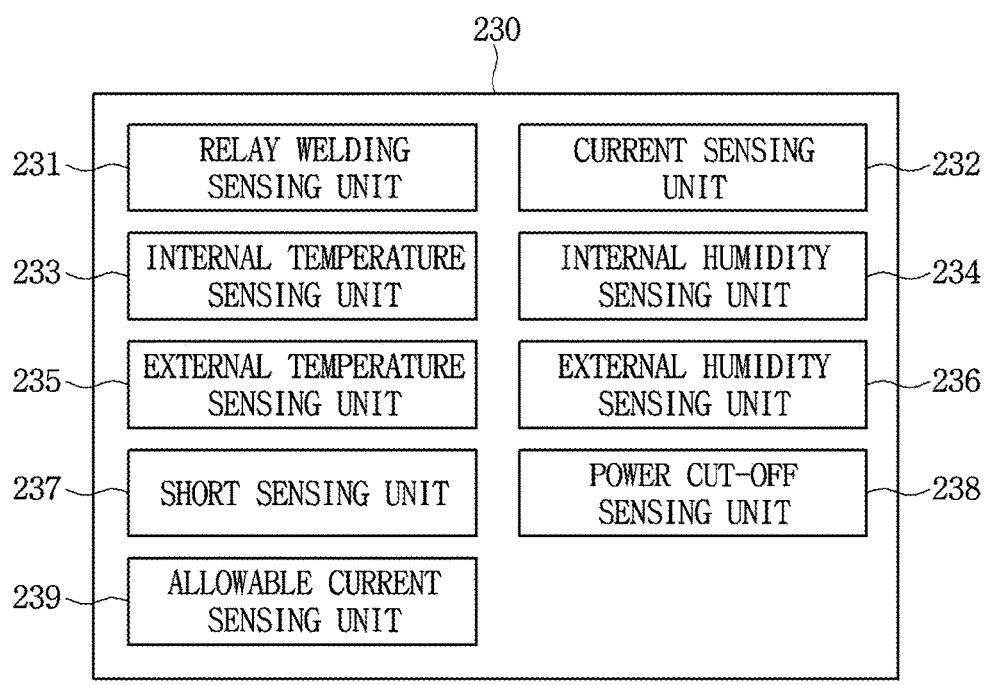
FIG. 4 is a block diagram of a sensing unit according to an embodiment.

FIG. 4 is a block diagram of a sensing unit according to an embodiment.

As shown in FIG. 4, the sensing unit 230 may include a relay welding sensing unit 231, a current sensing unit 232, an internal temperature sensing unit 233, an internal humidity sensing unit 234, an external temperature sensing unit 235, an external humidity sensing unit 236, a short sensing unit 237, a disconnection sensing unit 238, and an allowable current sensing unit 239.

The relay welding sensing unit 231 may sense the presence or absence of the welding of at least one relay 220.

The current sensing unit 232 may sense the size of a current flowing through the power cable 53.

The internal temperature sensing unit 233 may sense the internal temperature of the EV charge cable assembly 20.

The internal humidity sensing unit 234 may sense the internal humidity of the EV charge cable assembly 20.

The external temperature sensing unit 235 senses the ambient temperature of the cable-use charge control device 200.

The external humidity sensing unit 236 senses the ambient humidity of the cable-use charge control device 200.

The short sensing unit 237 may sense the presence or absence of a short of the EV charge cable assembly 20.

The disconnection sensing unit 238 may sense the presence or absence of the disconnection of the EV charge cable assembly 20.

The allowable current sensing unit 239 may include a first allowable current sensing unit and a second allowable current sensing unit.

The first allowable current sensing unit senses the allowable current of the EV-side power cable assembly 50. In particular, the first allowable current sensing unit senses the allowable current of the EV-side power cable 53.

The second allowable current sensing unit senses the allowable current of the grid-side power cable assembly 60. In particular, the second allowable current sensing unit senses the allowable current of the grid-side power cable.

Figure 5:
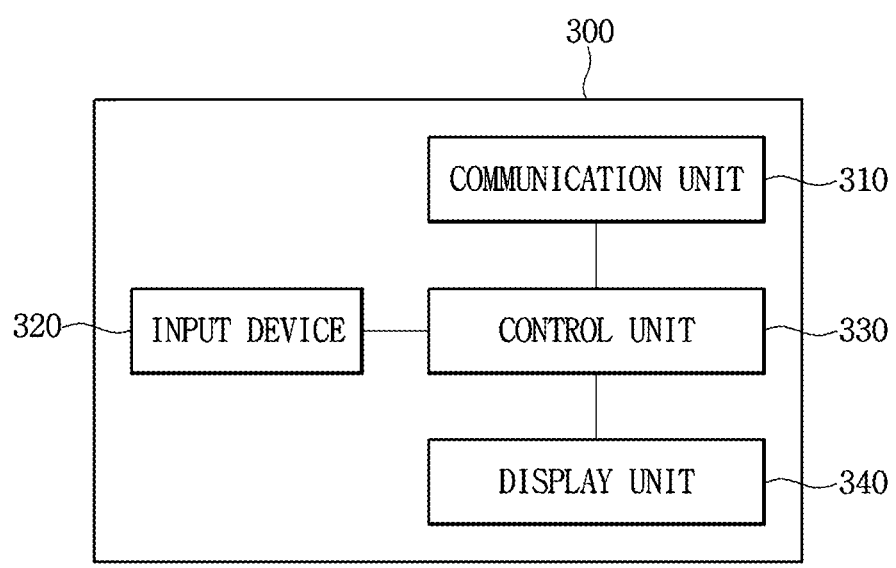
FIG. 5 is a block diagram of a terminal device according to an embodiment.

FIG. 5 is a block diagram of a terminal device according to an embodiment.

A terminal device 300 includes a communication unit 310, an input device 320, a control unit 330, and a display unit 340.

The communication unit 310 communicates with the terminal device communication unit 250.

The input device 320 obtains a user input. The input device 320 may include one or more of a touch screen, a physical button, a microphone for obtaining a user input having a voice form, an acceleration sensor for obtaining the motion gesture of the terminal device 30 as a user input, a keyboard, a mouth, and a keypad.

The control unit 330 controls the overall operations of the terminal device 300 including operations to be described below.

The display unit 340 displays information on the charge operation and state of the cable-use charge control device 200. Also, the display unit 340 may display information on the fault of the cable-use charge control device 200 and on user actions corresponding thereto. For example, the display unit 340 may display the information on the charge operation and state of the cable-use charge control device 200, by using a visual display method including at least one of a character, figure and light and/or by using an audio output method including sound.

Figure 6:
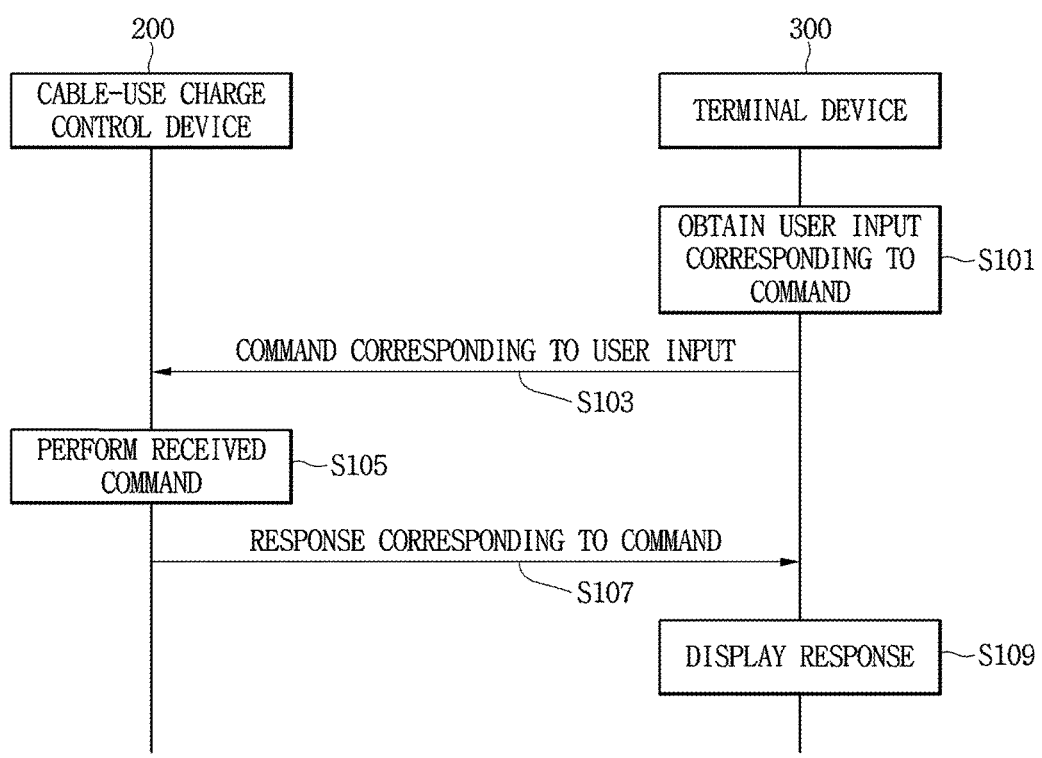
FIG. 6 is a ladder diagram showing an operating method of an EV charging system according to an embodiment.

FIG. 6 is a ladder diagram showing an operating method of an EV charging system 10 according to an embodiment.

A control unit 330 of a terminal device 300 obtains a user input for commanding an EV charge cable assembly 20 through an input device 320 in step S101. In this case, the user input for the control of the EV charge cable assembly 20 may include one or more of the charge start of the EV 100, the charge stop of the EV 100 and a request for EV charge related information.

The control unit 330 of the terminal device 300 transmits a command corresponding to the obtained user input to a cable-use charge control device 200 through a communication unit 310 in step S103. A control unit 270 of the cable-use charge control device 200 receives the command through a terminal device communication unit 250.

The control unit 270 of the cable-use charge control device 200 performs the received command in step S105.

In particular, if the command corresponding to the user input is the charge start of the EV 100, the control unit 270 of the cable-use charge control device 200 turns on at least one of relays 220 turned off so that the EV charge cable assembly 20 may supply the AC power from a socket 30 to the EV 100.

More particularly, if the command corresponding to the user input is the charge start of the EV 100, the control unit 270 of the cable-use charge control device 200 provides at least one of information on the allowable current of the EV-side power cable assembly 50 and information on the allowable current of the grid-side power cable assembly 60 to a battery charging device 115 of the EV 100 through an EV-side data communication cable 55. In addition, the control unit 270 of the cable-use charge control device 200 turns on at least one of relays 220 turned off. Then, the battery charging device 115 of the EV 100 may determine a charge current based on the provided information and then take the determined charge current through the EV charge cable assembly 20 to charge a battery 110.

If the control unit 270 provides information on the allowable current of the EV-side power cable assembly 50, the battery charging device 115 of the EV 100 may use a current smaller than or equal to the allowable current to charge the battery 110.

If the control unit 270 provides information on the allowable current of the grid-side power cable assembly 60, the battery charging device 115 of the EV 100 may use a current smaller than or equal to the allowable current to charge the battery 110.

If the control unit 270 provides information on the allowable current of the EV-side power cable assembly 50 and information on the allowable current of the grid-side power cable assembly 60, the battery charging device 115 of the EV 100 may use a current smaller than or equal to a smaller one of the two allowable currents to charge the battery 110.

If the command corresponding to the user input is the charge stop of the EV 100, the control unit 270 of the cable-use charge control device 200 turns off at least one of relays 220 turned on so that the EV charge cable assembly 20 may no longer charge the EV 100.

If the command corresponding to the user input is the request for the EV charge related information, the control unit 270 of the cable-use charge control device 200 collects EV charge related information.

The control unit 270 of the cable-use charge control device 200 transmits a response corresponding to the received command to the terminal device 300 through the terminal device communication unit 250 in step S107.

If the command corresponding to the user input is the charge start of the EV 100, the response may include information notifying that the state of at least one relay 220 is in a turn-on state.

If the command corresponding to the user input is the charge stop of the EV 100, the response may include information notifying that the state of at least one relay 220 is in a turn-off state.

If the command corresponding to the user input is the request for the EV charge related information, the response may include collected EV charge related information.

The EV charge related information may include at least one of information on the EV 100 and information on the EV charge cable assembly 20.

The information on the EV 100 may include at least one of an initial charge state, the current charge state, a charge start time, a predicted charge end time, an actual charge end time, EV charge status information, EV charge error information, information on an amount of power supplied to the EV 100, and information on the size of a current applied to the EV 100. The initial charge state and the current charge state may be represented by a ratio of the current charge amount to gross capacity. The EV charge status information may represent whether the EV 100 is being charged, waits for charge or has been completely charged.

The information on the EV charge cable assembly 20 may include at least one of information on the charge operation of the EV charge cable assembly 20, information on the usage history of the EV charge cable assembly 20, state information on the EV charge cable assembly 20, information on the fault of the EV charge cable assembly 20, information on the allowable current of the EV-side power cable assembly 50, and information on the allowable current of the grid-side power cable assembly 60. The information on the charge operation of the EV charge cable assembly 20 may represent whether the EV charge cable assembly 20 supplies power from the socket 30 to the EV 100. The state information on the EV charge cable assembly 20 may include at least one of information on the state of at least one relay 220, information on the presence or absence of the welding of at least one relay 220, information on the temperature of the EV charge cable assembly 20, information on the disconnection of the EV charge cable assembly 20, information on the disconnection of the EV charge cable assembly 20, and ambient environmental information on the EV charge cable assembly 20. The information on the state of the at least one relay 220 may represent whether the at least one relay 220 has been turned on or off. The ambient environmental information on the EV charge cable assembly 20 may include at least one of information on ambient temperature and information on ambient humidity.

The control unit 330 of the terminal device 300 displays a received response on a display unit 340 in step S109.

If the command corresponding to the user input is the charge start of the EV 100, a control unit 330 of a terminal device 300 may display, on the display unit 340 information notifying that the state of at least one relay 220 is in a turn-on state.

If the command corresponding to the user input is the charge stop of the EV 100, the control unit 330 of the terminal device 300 may display, on the display unit 340 information notifying that the state of at least one relay 220 is in a turn-off state.

If the command corresponding to the user input is the request for the EV charge related information, the control unit 330 of the terminal device 300 may display EV charge related information on the display unit 340. A user may input an additional user input for the control of the EV charge cable assembly 20 to the terminal device 300 through an input device 320 with reference to the displayed EV charge related information.

As such, information on the charge operation and state of the EV charge cable assembly 20 is displayed through the terminal device 300. Thus, a user may more conveniently and easily recognize the information on the charge operation and state of the EV charge cable assembly 20. Also, the user may more easily determine the presence or absence of a fault of the EV charge cable assembly 20 and a fault part through the information on the state of the EV charge cable assembly 20 to be capable of taking actions rapidly. For example, when the grounding cable between the EV charge cable assembly 20 and a commercial power supply is shorted, it was typically difficult to sense it. However, since in the present embodiment, a sensing unit 230 senses and displays the presence or absence of disconnection, the user may stop the charge operation of the EV charge cable assembly 20 and repair a disconnected part or request for a repair. In particular, when information on the fault and corresponding action of the EV charge cable assembly 20 is transmitted from the cable-use charge control device 200 to the terminal device 300, the user may recognize the presence or absence of a fault and take an action more conveniently and easily. Thus, the user may previously recognize that the EV 100 is not charged due to the fault of the EV charge cable assembly 20. Also, when e.g., the usage history of the EV charge cable assembly 20 is transmitted to the terminal device, the user may predict the life of the EV charge cable assembly and provide an extra EV charge cable assembly. Since the EV charge cable assembly 20 is used in a bad environment in many cases, it may cause frequent repair and replacement. However, when the EV charge cable assembly 20 has a cable-use charge control device 200 including a terminal device communication unit 250 which is relatively expensive, repair may be more difficult due to the characteristics of the cable-use charge control device 200 manufactured to have characteristics resistant to external temperature, external humidity, vibration, and shock, and it is cause an increase in cost-bearing when replacement is performed.

In order to solve such a limitation, it is possible to consider providing the terminal device communication unit of the cable use charge control device 200 as a separate device. Such an embodiment is described with reference to FIGS. 7 to 10.

Figure 7:
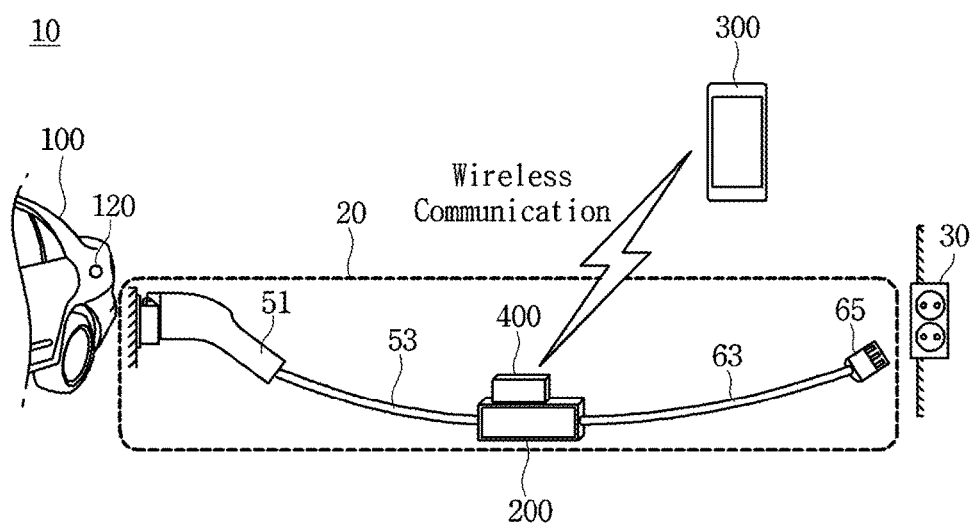
FIG. 7 is a conceptual view of a charging system for an EV according to another embodiment.

FIG. 7 is a conceptual view of an EV charging system according to another embodiment.

Referring to FIG. 7, an EV charging system 10 according to an embodiment includes an EV 100, an EV charge cable assembly 20, a socket 30, a terminal device 300, and an add-on communication device 400.

In particular, since a system in FIG. 7 is obtained by adding the add-on communication device 400 to the system in FIG. 1 and thus other parts excluding the add-on communication device 400 are the same, their detailed descriptions are omitted.

The cable-use charge control device 200 monitors the charge of the EV 100, provides charge related information obtained from the monitoring, to the add-on communication device 400 and controls the charge of the EV 100.

When the cable-use charge control device 200 includes a connector for wired communication, it may be vulnerable to external conditions because the connector includes a metal terminal. In order to solve such a limitation, the cable-use charge control device 200 may communicate with the add-on communication device 400 wirelessly.

The terminal device 300 performs contactless, wireless communication with the add-on communication device 400 and displays information on the EV charge cable assembly 20.

The add-on communication device 400 is attached to the cable-use charge control device 200. In this case, the add-on communication device 400 may also be mechanically coupled to the cable-use charge control device 200. Also, the add-on communication device 400 may also be attached to the cable-use charge control device 200 by magnetism.

Figure 8:
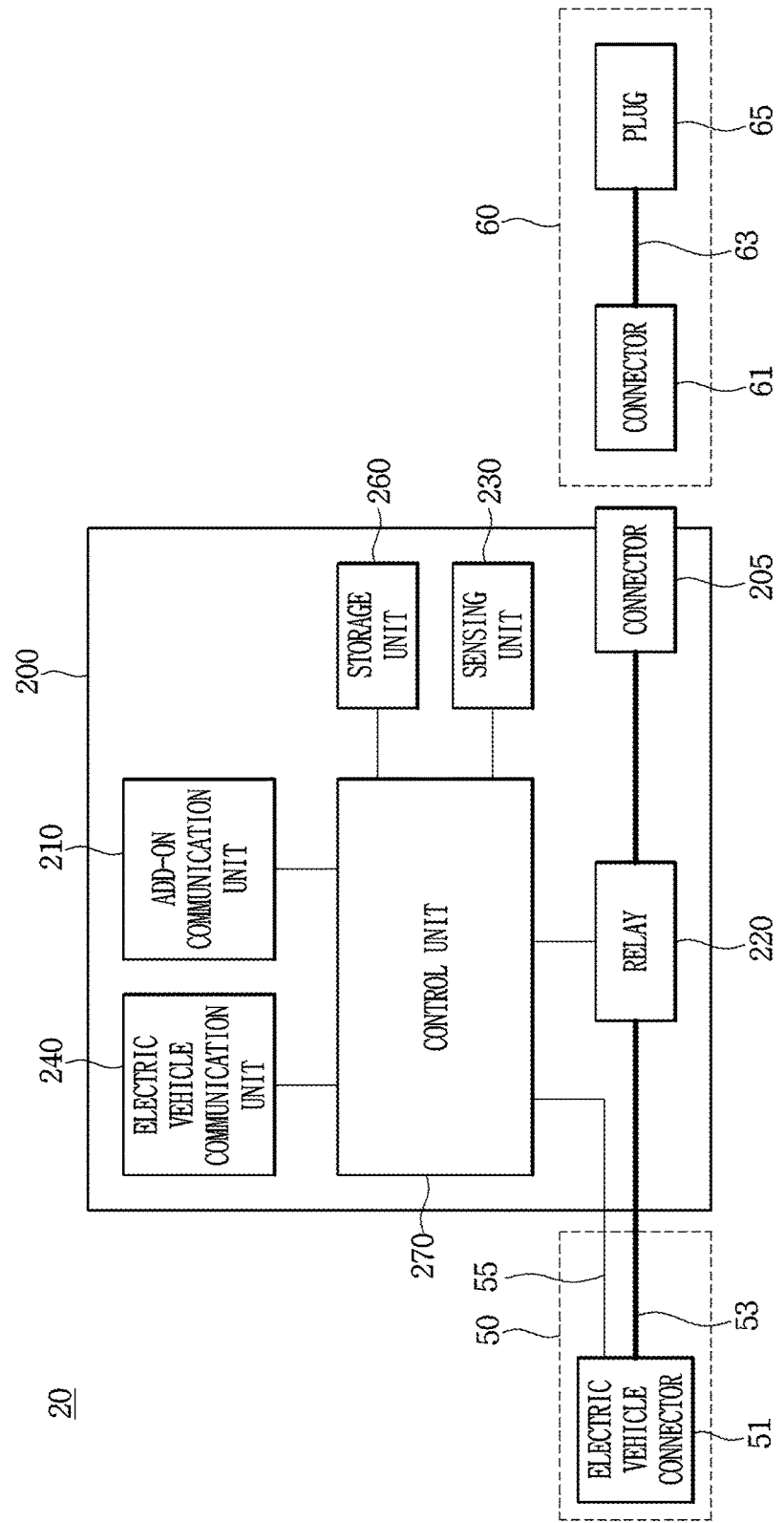
FIG. 8 is a block diagram of an EV charge cable assembly according to another embodiment.

FIG. 8 is a block diagram of an EV charge cable assembly according to another embodiment.

When compared to the embodiment in FIG. 3, the cable-use charge control device 200 in FIG. 8 further includes an add-on communication unit 210. Also, the cable-use charge control device 200 in FIG. 8 may not have a terminal device communication unit 250 in order to lower cost and repair cost but it is also possible to include the terminal device communication unit 250 in various applications.

The operations of at least one relay 220, a sensing unit 230, an EV communication unit 240, a storage unit 260 and a control unit 270 are the same or similar as those in the embodiment in FIG. 3 or are described below.

The add-on communication unit 210 performs communication with the add-on communication device 400. The add-on communication unit 210 and the add-on communication device 400 may also use an Infrared Data Association (IrDA) communication technology, a Radio Frequency communication technology, Bluetooth, Ultra Wideband (UWB), ZigBee, Digital Living Network Alliance (DLNA), and so on to perform communication.

In particular, in order to lower the costs of the EV charge cable assembly 20 and the add-on communication device 400, the add-on device communication unit 210 may use an IrDA communication technology. In this case, the add-on communication unit 210 may include an infrared light-emitting diode and an infrared light-receiving diode.

Figure 9:
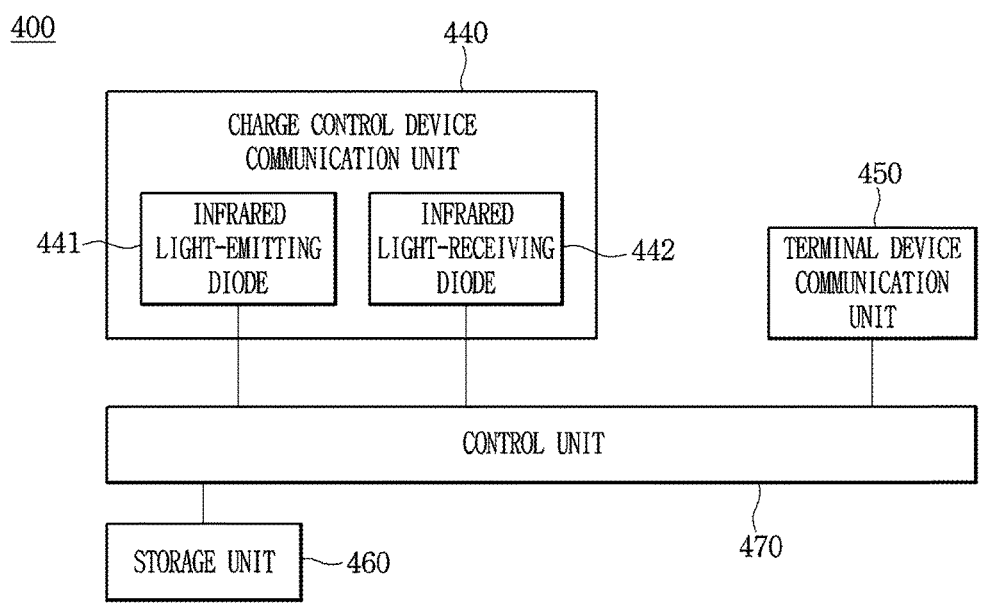
FIG. 9 is a block diagram of an add-on communication device according to an embodiment.

FIG. 9 is a block diagram of an add-on communication device according to an embodiment.

The add-on communication device 400 includes a charge control device communication unit 440, a terminal device communication unit 450, a storage unit 460, and a control unit 470.

The charge control device communication unit 440 performs communication with a cable-use charge control device 200. In particular, the charge control device communication unit 440 communicates with the add-on device communication unit 210 of the cable-use charge control device 200. The charge control device communication unit 440 and the add-on device communication unit 210 may also use an Infrared Data Association (IrDA) communication technology, a Radio Frequency communication technology, Bluetooth, Ultra Wideband (UWB), ZigBee, Digital Living Network Alliance (DLNA), and so on to perform communication.

In order to lower the costs of the EV charge cable assembly 20 and the add-on communication device 400, the charge control device communication unit 440 may use an IrDA communication technology. In this case, the charge control device communication unit 440 may include an infrared light-emitting diode 441 and an infrared light-receiving diode 442.

When the add-on communication device 400 is normally attached to the cable-use charge control device 200, the positions of the infrared light-emitting diode 441 and the infrared-light receiving diode 442 of the charge control device communication unit 440 match the infrared light-receiving diode and the infrared light-emitting diode of the add-on device communication unit 210 of the cable-use charge control device 200, respectively.

The terminal device communication unit 450 performs communication with a terminal device 300. In particular, the terminal device communication unit 450 performs communication with a communication unit 310 in the terminal device 300. In particular, the terminal device communication unit 450 and the communication unit 310 may also use an Infrared Data Association (IrDA) communication technology, a Radio Frequency communication technology, Bluetooth, Ultra Wideband (UWB), ZigBee, Digital Living Network Alliance (DLNA), and so on to perform communication. In particular, the terminal device communication unit 450 may use at least one of a wireless local area network (WLAN), such as WiFi defined in IEEE 802.11, and a wireless wide area network (WWAN) defined in IEEE 802.16 or long term evolution (LTE) standard to perform communication with the terminal device 300.

The storage unit 460 stores pieces of information to be described below. In particular, the storage unit 460 may store EV charge related information. The storage unit 460 may store information on the usage history of the cable-use charge control device 210. For example, the storage unit 460 may store information on the last usage time and time length and accumulated usage time length of the cable-use charge control device 200.

The control unit 470 controls the overall operations of the add-on communication device 400, including operations to be described below.

Since the add-on communication device 400 is not in direct contact electrically with the cable-use charge control device 200, it has no need to separately receive power. However, when a user does not use the add-on communication device 400, the user may not cut off the supply of power to the add-on communication device 400. Since it unnecessarily increases power consumption, there is a need for a solution that may minimize power consumption when the add-on communication device 400 is not used.

Figure 10:
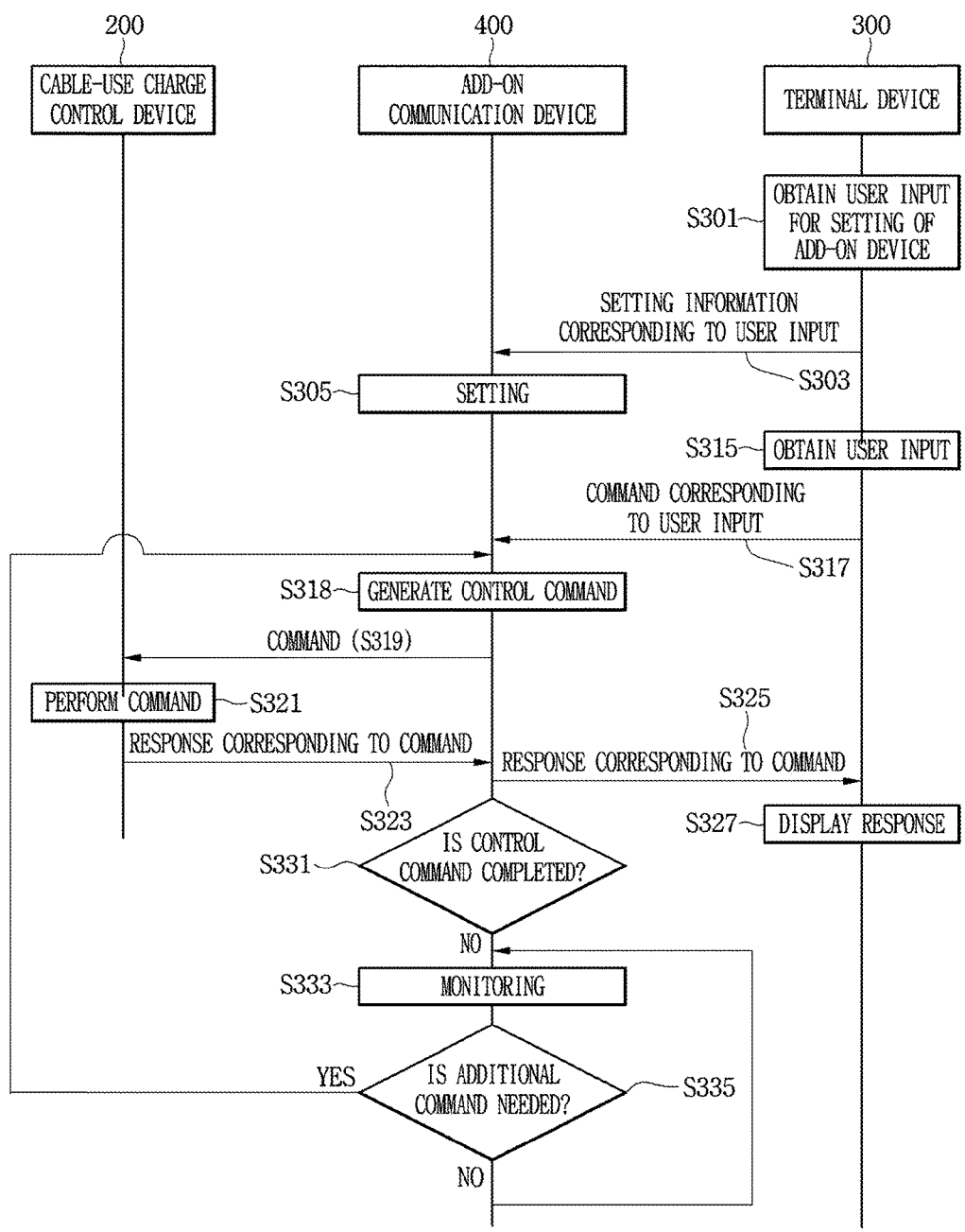
FIG. 10 is a ladder diagram showing an operating method of an EV charging system according to another embodiment.

FIG. 10 is a ladder diagram showing an operating method of an EV charging system 10 according to another embodiment.

A control unit 330 of a terminal device 300 obtains a user input for the setting of an add-on charging device 400 through an input device 320 in step S301. The user input for the setting of the add-on communication device 400 may include at least one of a charge limit and a charge mode. The charge limit may include at least one of a charge limit in a public area and a charge limit in a home area. The charge mode may include at least one of a charge mode in the public area and a charge mode in the home area. The charge amount may be an absolute value expressed in units of Wh or a relative value expressed in units of %. A set of values that the charge mode may represent may include a fast charge mode and a slow charge mode.

The control unit 330 of the terminal device 300 controls the communication unit 310 so that setting information corresponding to a user input obtained by the communication unit 310 is transmitted to the add-on communication device 400 through an EV-side data communication line 55 in step S303. In this case, the setting information may include at least one of setting information on the charge limit and setting information on the charge mode. The setting information on the charge limit may include at least one of setting information on the charge limit in the public area and setting information on the charge limit in the home area. The setting information on the charge mode may include at least one of setting information on the charge mode in the public area and setting information on the charge mode in the home area. Accordingly, the control unit 470 of the add-on communication device 400 receives setting information from the terminal device 300 through the terminal device communication unit 450.

The add-on communication device 400 stores the received setting information in the storage unit 460 and sets the add-on communication device 400 based on the received setting information in step S305.

A control unit 330 of a terminal device 300 obtains a user input for commanding an EV charge cable assembly 20 through an input device 320 in step S315. In this case, the user input for the control of the EV charge cable assembly 20 may include one or more of the charge start of an EV 100, the charge stop of the EV 100 and a request for EV charge related information. The user input may include at least one of a fast charge start and a slow charge start.

The control unit 330 of the terminal device 300 transmits a command corresponding to the obtained user input to the add-on communication device 400 through the communication unit 310 in step S317. The control unit 470 of the add-on communication device 400 may receive a command from the terminal device 300 through the terminal device communication unit 450. In this case, a set of values that the command may represent may include the charge start of the EV 100, the charge stop of the EV 100, and a request for EV charge related information. A set of values that the charge start of the EV 100 may represent may include the fast charge start and slow charge start of the EV 100.

The control unit 470 of the add-on communication device 400 generates a control command for the control of the cable-use charge control device 200 in step S318. The control unit 470 of the add-on communication device 400 may generate a control command based on at least one of a command received from the terminal device 300, the current position, setting information, the charge stage of the EV 100 being a result of monitoring to be described below. In this case, a set of values that the control command may represent may include a charge start, a chart stop, and a request for EV charge related information. A set of values that the charge start may represent may include a fast charge start and a slow charge start.

In an embodiment, when the command received from the terminal device 300 is the charge start, the control unit 470 of the add-on communication device 400 may generate a control command representing the charge start.

In an embodiment, when the command received from the terminal device 300 is the fast charge start, the control unit 470 of the add-on communication device 400 may generate a control command representing the fast charge start.

In an embodiment, when the command received from the terminal device 300 is the slow charge start, the control unit 470 of the add-on communication device 400 may generate a control command representing the slow charge start.

In an embodiment, when the command received from the terminal device 300 is the charge start and the set charge mode is the fast charge mode, the control unit 470 of the add-on communication device 400 may generate a control command representing the fast charge start.

In an embodiment, when the command received from the terminal device 300 is the charge start and the set charge mode is the slow charge mode, the control unit 470 of the add-on communication device 400 may generate a control command representing the slow charge start.

In an embodiment, when the command received from the terminal device 300 is the charge stop, the control unit 470 of the add-on communication device 400 may generate a control command representing the charge stop.

In an embodiment, when the command received from the terminal device 300 is the request for the EV charge related information, the control unit 470 of the add-on communication device 400 may generate a control command representing the request for the EV charge related information.

In an embodiment, when the command received from the terminal device 300 is the charge start and the current position is the home area, the control unit 470 of the add-on communication device 400 may generate a control command representing the charge start according to the set charge mode in the home area. In particular, when the set charge mode in the home area is the fast charge mode, the control unit 470 of the add-on communication device 400 may generate a control command representing the fast charge start. When the set charge mode in the home area is the slow charge mode, the control unit 470 of the add-on communication device 400 may generate a control command representing the slow charge start.

In an embodiment, when the command received from the terminal device 300 is the charge start and the current position is the public area, the control unit 470 of the add-on communication device 400 may generate a control command representing the charge start according to the set charge mode in the public area. In particular, when the set charge mode in the public area is the fast charge mode, the control unit 470 of the add-on communication device 400 may generate a control command representing the fast charge start. When the set charge mode in the public area is the slow charge mode, the control unit 470 of the add-on communication device 400 may generate a control command representing the slow charge start.

In an embodiment, when the command received from the terminal device 300 is the charge start and the current position is the home area, the control unit 470 of the add-on communication device 400 may generate a control command representing the slow charge start.

In an embodiment, when the command received from the terminal device 300 is the charge start and the current position is the public area, the control unit 470 of the add-on communication device 400 may generate a control command representing the fast charge start.

In an embodiment, when the command received from the terminal device 300 is the charge start and as a result of monitoring, the amount of power supplied to the EV 100 reaches the set charge limit, the control unit 470 of the add-on communication device 400 may generate a control command representing the charge stop.

In an embodiment, when the command received from the terminal device 300 is the charge start, the current position is the home area, and as a result of monitoring, the amount of power supplied to the EV 100 reaches the set charge limit in the home area, the control unit 470 of the add-on communication device 400 may generate a control command representing the charge stop.

In an embodiment, when the command received from the terminal device 300 is the charge start, the current position is the public area, and as a result of monitoring, the amount of power supplied to the EV 100 reaches the set charge limit in the public area, the control unit 470 of the add-on communication device 400 may generate a control command representing the charge stop.

To this end, the control unit 470 of the add-on communication device 400 may obtain the current position of the EV 100. The control unit 470 of the add-on communication device 400 may use one or more of global positioning system GPS information, base station information on a WLAN, base station information on a WWAN to obtain the current position of the EV 100.

A set of values that the current location may represent may be the home area and the public area.

The control unit 470 of the add-on communication device 400 transmits a generated control command to the cable-use charge control device 200 through the charge control device communication unit 440 in step S319. An infrared light-emitting diode 441 of the charge control device communication unit 440 may radiate an infrared ray having a digital pattern corresponding to the generated control command.

The control unit 270 of the cable-use charge control device 200 performs the received command in step S321.

In particular, if the command corresponding to the user input is the charge start of the EV 100, the control unit 270 of the cable-use charge control device 200 turns on at least one of relays 220 turned off so that the EV charge cable assembly 20 may supply AC power from a socket 30 to the EV 100.

If the command corresponding to the user input is the fast charge start of the EV 100, the control unit 270 of the cable-use charge control device 200 turns on at least one of relays 220 turned off so that the EV charge cable assembly 20 may fast supply AC power from the socket 30 to the EV 100.

If the command corresponding to the user input is the slow charge start of the EV 100, the control unit 270 of the cable-use charge control device 200 turns on at least one of relays 220 turned off so that the EV charge cable assembly 20 may slowly supply AC power from the socket 30 to the EV 100.

If the command corresponding to the user input is the charge stop of the EV 100, the control unit 270 of the cable-use charge control device 200 turns off at least one of relays 220 turned on so that the EV charge cable assembly 20 may no longer charge the EV 100.

If the command corresponding to the user input is the request for the EV charge related information, the control unit 270 of the cable-use charge control device 200 collects EV charge related information.

The control unit 270 of the cable-use charge control device 200 transmits a response corresponding to the received command to the add-on communication device 400 through the add-on communication unit 250 in step S323. The infrared light-emitting diode of the add-on communication unit 210 of the cable-use charge control device 200 may irradiate an infrared ray having a digital pattern corresponding to a response corresponding to the received command. The control unit 470 of the add-on communication device 400 may receive a response from the cable-use charge control device 200 through the charge control device communication unit 440.

If the command corresponding to the user input is the charge start of the EV 100, the response may include information notifying that the state of at least one relay 220 is in a turn-on state.

If the command corresponding to the user input is the fast charge start of the EV 100, the response may include information notifying that the state of at least one relay 220 is in a turn-on state for fast charge. If the command corresponding to the user input is the slow charge start of the EV 100, the response may include information notifying that the state of at least one relay 220 is in a turn-on state for slow charge.

If the command corresponding to the user input is the charge stop of the EV 100, the response may include information notifying that the state of at least one relay 220 is in a turn-off state.

If the command corresponding to the user input is the request for the EV charge related information, the response may include collected EV charge related information. As described earlier, the EV charge related information may include at least one of information on the EV 100 and information on the EV charge cable assembly 20.

The control unit 470 of the add-on communication device 400 transmits a received response to the terminal device 300 through the terminal device communication unit 450 in step S325.

The control unit 330 of the terminal device 300 displays a received response on a display unit 340 in step S327. Since the operation described in step S109 may be applied to the operation in step S327, detailed descriptions for the operation in step S327 are omitted.

The control unit 470 of the add-on communication device 400 checks whether a generated control command has been completed in step S331.

When the generated control command is a charge start, a charge limit has been set, and charge is not yet completed, the control unit 470 of the add-on communication device 400 may determine that the generated control command has not been completed.

When the generated control command is a charge stop or a request for EV charge related information or the control command is the charge start while the charge limit has not been set, the control unit 470 of the add-on communication device 400 may determine that the generated control command has been completed.

When the received control command has been completed, the control unit 470 of the add-on communication device 400 may wait for the reception of new setting information or a new command.

When the generated control command has not been completed, the control unit 470 of the add-on communication device 400 monitors the charge state of the EV 100 in step S333. In particular, the control unit 470 of the add-on communication device 400 may monitor the amount of power supplied to the EV 100.

The control unit 470 of the add-on communication device 400 checks based on at least one of the charge state the EV 100 and setting information thereon whether the cable-use charge control device 200 needs an additional control command in step S335. In particular, the control unit 470 of the add-on communication device 400 may compare the amount of power supplied to the EV 100 with a set charge limit to check whether the cable-use charge control device 200 needs an additional control command. If the amount of power supplied to the EV 100 reaches the set charge limit, the control unit 470 of the add-on communication device 400 may determine that the cable-use charge control device 200 needs an additional control command. If the amount of power supplied to the EV 100 does not reach the set charge limit, the control unit 470 of the add-on communication device 400 may determine that the cable-use charge control device 200 does not need an additional control command.

When the additional control command is not needed, the control unit 470 of the add-on communication device 400 may continue to monitor the charge state of the EV 100.

When the additional control command is needed, the control unit 470 of the add-on communication device 400 generates the additional control command in step S318. Since the generation of the control command has been described earlier, its description is omitted in this section.

Figure 11:
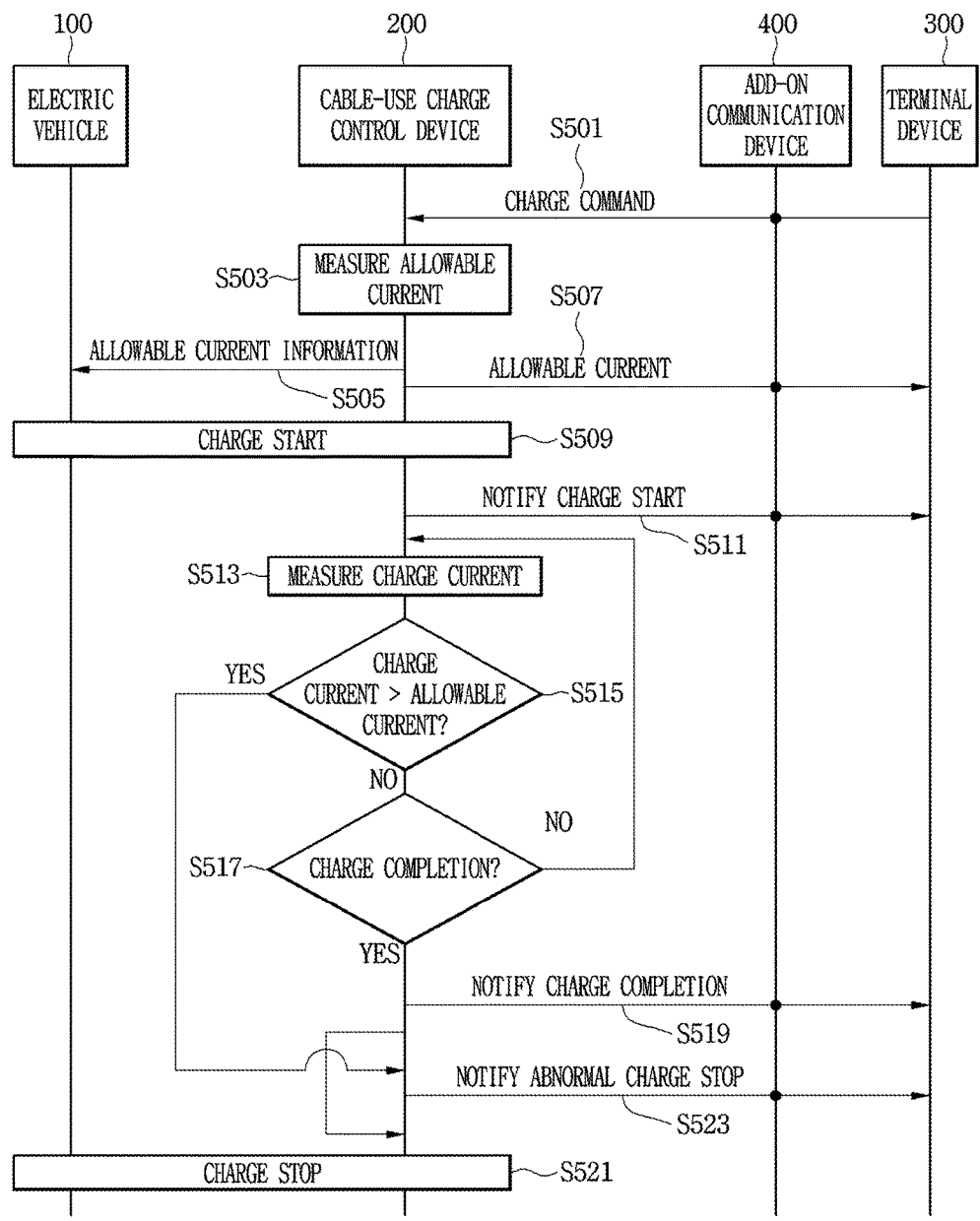
FIG. 11 is a ladder diagram showing an operating method of an EV charging system 10 according to another embodiment.

FIG. 11 is a ladder diagram showing an operating method of an EV charging system 10 according to another embodiment.

A terminal device 300 transmits a charge command to a cable-use charge control device 200 in step S501.

When the cable-use charge control device 200 receives the charge command, a control unit 270 of the cable-use charge control device 200 measures the allowable current of an EV charge cable assembly 20 through an allowable current sensing unit 239 in step S503.

In this case, the allowable current of the EV charge cable assembly 20 may also be the allowable current of an EV-side power cable assembly 50 or the allowable current of a grid-side power cable assembly 60. Also, the allowable current of the EV charge cable assembly 20 may also be an allowable current satisfying both the allowable current of the EV-side power cable assembly 50 and the allowable current of the grid-side power cable assembly 60. More particularly, the allowable current of the EV charge cable assembly 20 may also be a smaller one of the allowable current of the EV-side power cable assembly 50 and the allowable current of the grid-side power cable assembly 60.

In an embodiment, when the EV-side power cable assembly 50 is integrally attached to the cable-use charge control device 200 not to be separated therefrom and is manufactured so that the allowable current of the EV-side power cable assembly 50 is relatively high, the cable-use charge control device 200 may measure the allowable current of the grid-side power cable assembly 60 without measuring the allowable current of the EV-side power cable assembly 50.

The cable-use charge control device 200 transmits information on the measured allowable current to the EV 100 in step S505.

In this case, the cable-use charge control device 200 may transmit at least one of information on the allowable current of the EV-side power cable assembly 50, information on the allowable current of the grid-side power cable assembly 60, and information on an allowable current satisfying the two allowable currents.

The cable-use charge control device 200 transmits information on the measured allowable current to a terminal device 300 in step S505.

In this case, the cable-use charge control device 200 may transmit at least one of information on the allowable current of the EV-side power cable assembly 50, information on the allowable current of the grid-side power cable assembly 60, and information on an allowable current satisfying the two allowable currents.

The EV 100 and the cable-use charge control device 200 starts charging a battery 110 of the EV 100 in step S509. In this case, the control unit 270 of the cable-use charge control device 200 may turn on a relay 220 turned off so that the EV charge cable assembly 20 may provide AC power from a socket 30 to the EV 100.

A battery charging device 115 of the EV 100 may determine a charge current based on the provided information and then take the determined charge current through the EV charge cable assembly 20 to charge the battery 110. That is, the battery charging device 115 of the EV 100 may use a charge current satisfying the allowable current of the EV charge cable assembly 20 to charge the battery 110.

The cable-use charge control device 200 notifies the terminal device 300 of a charge start in step S511.

The control unit 270 of the cable-use charge control device 200 measures the charge current through a current sensing unit 232 in step S513.

The control unit 270 of the cable-use charge control device 200 senses whether the charge current exceeds the allowable current, in step S513.

If the charge current does not exceed the allowable current, the control unit 270 of the cable-use charge control device 200 checks whether charge has been completed, in step S517.

If the charge has been completed, the EV 100 and the cable-use charge control device 200 continue to charge the battery 110 of the EV 100.

If the charge has been completed, the cable-use charge control device 200 notifies the terminal device of a charge stop in step S519 and stops charging the battery 110 in step S521. In this case, the control unit 270 of the cable-use charge control device 200 turns off a relay 220 turned on.

On the other hand, if the charge current exceeds the allowable current, the cable-use charge control device 200 transmits, in step S523, to the terminal device 300 an abnormal charge stop notification message notifying that the charge current has exceeded the allowable current and stops charging the battery 110 in step S521. In this case, the control unit 270 of the cable-use charge control device 200 turns off the relay 220 turned on.

In FIG. 11, information exchange between the cable-use charge control device 200 and the terminal device may also be performed without or with the add-on communication device 400.

The communication between the EV 100 and the cable-use charge control device 200, the communication between the cable-use charge control device 200 and the add-on communication device 400, the communication between the cable-use charge control device 200 and the terminal device 300 and the communication between the add-on communication device 400 and the terminal device 300 may conform on the above-described technology.

In FIG. 11, when the terminal device 300 receives information, the terminal device 300 may also display corresponding information. As an example, when the terminal device 300 receives the abnormal charge stop notification message notifying that the charge current has exceeded the allowable current, the terminal device 300 may display the fact that the charge current has exceeded the allowable current.

In the following, a typical welding sensing method by an EV charge cable assembly 20 is described with reference to FIGS. 12 to 13.

Figure 12:
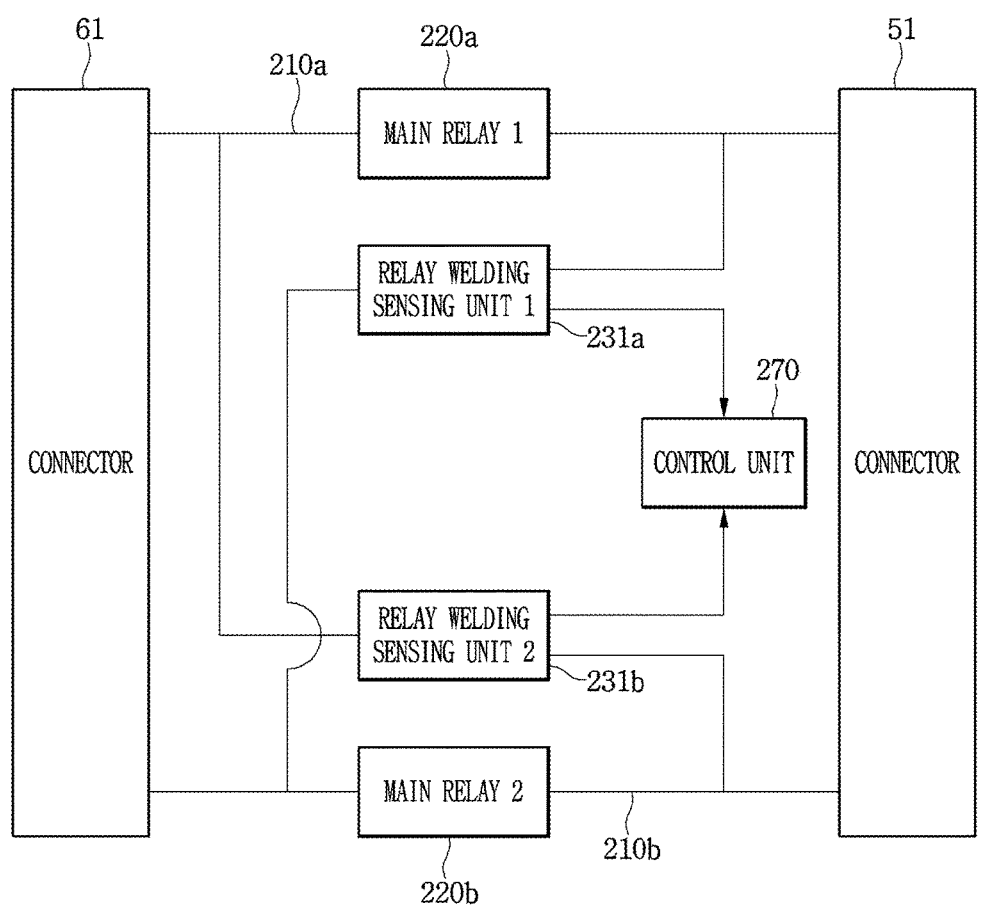
FIGS. 12 and 13 are block diagrams of a welding sensing unit in a charge cable assembly 20 for a typical EV.
Figure 13:
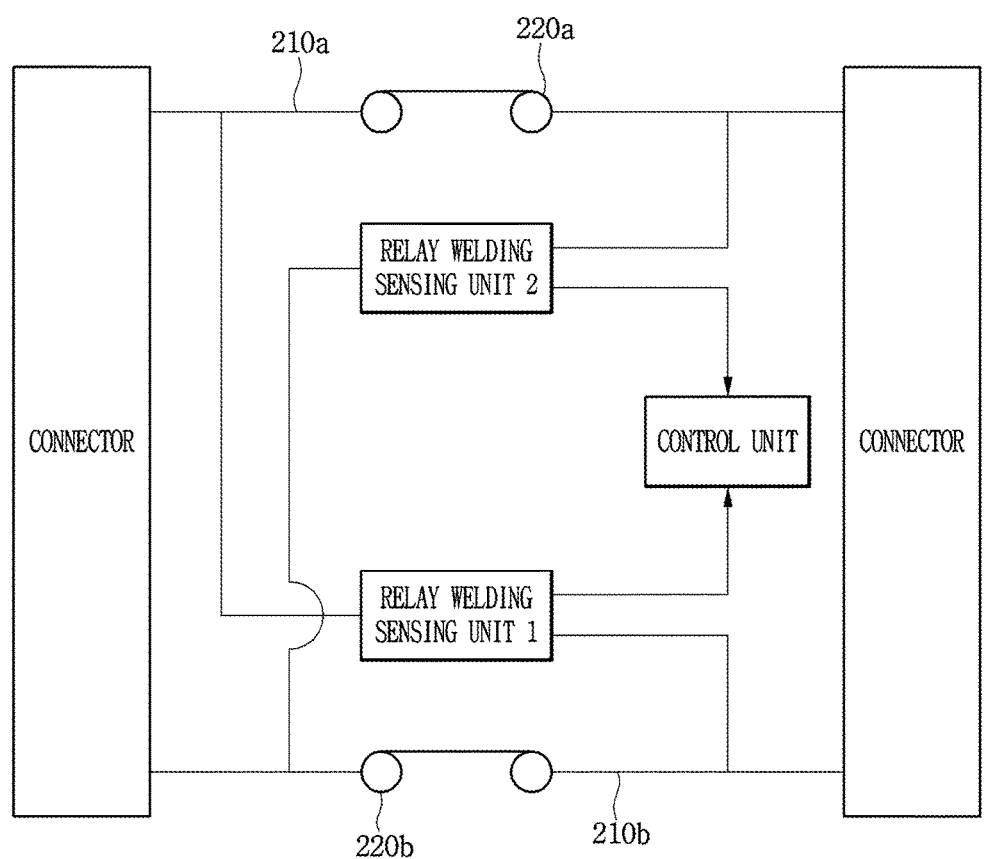

FIGS. 12 and 13 are block diagrams of a typical welding sensing unit in the EV charge cable assembly 20.

Referring to FIG. 12, a main relay and the welding sensing unit have typically crossed each other and thus have been directly connected each other. In particular, a main path 1 210a connected to the rear end of a main relay 1 220a and a main path 2 210b connected to the front end of a main relay 2 220b are connected to a welding sensing unit 1 231a. Also, the main path 1 210a connected to the front end of the main relay 1 220a and the main path 2 210b connected to the rear end of the main relay 2 220b are connected to a welding sensing unit 2 231b.

A limitation in the typical welding sensing method is particularly discussed with reference to FIG. 13.

Typically, a relay welding sensing unit 231 always maintains a state in which it is connected to each main relay 220. Thus, as shown in FIG. 13, power is consumed in a state in which main relays 220 are all closed, i.e., in which charge is being performed. However, since the relays need to be closed during charge, there is no need to determine the presence or absence of the welding of the main relay in this state. As a result, it may be seen that the relay welding sensing unit 231 unnecessarily consumes power. It is a limitation resulting from the fact that there is no relay to control the relay welding sensing unit according to the open and close of the main relay 220.

Also, as shown in FIG. 13, if the relay welding sensing unit 231 is directly connected to the main path 210, there is a possibility that a device is damaged because high current flowing in the main path 210 is directly received. In particular, since the relay welding sensing unit 231 is directly connected to the main path 210, there is a risk that a voltage exceeding the withstanding voltage of the relay welding sensing unit 231 is applied to a device during charge.

In this case, the withstanding voltage indicates the limit of an applied voltage capable of withstanding without destruction or the size limit of the applied voltage capable of being used without destruction of the insulation part of a machine or component when an AC voltage defined for an insulation material to be tested is applied for one minute. An evaluation method is determined by a test method or condition according to a defined applied voltage obtained by multiplying potential gradient (indicated in kV/mm) defined in a quality standard by the thickness (mm) of a test piece, a molding material, a laminated bar, and a laminated plate.

Thus, since there may typically be the above-described limitation. the present disclosure solving it is described below.

Figure 14:
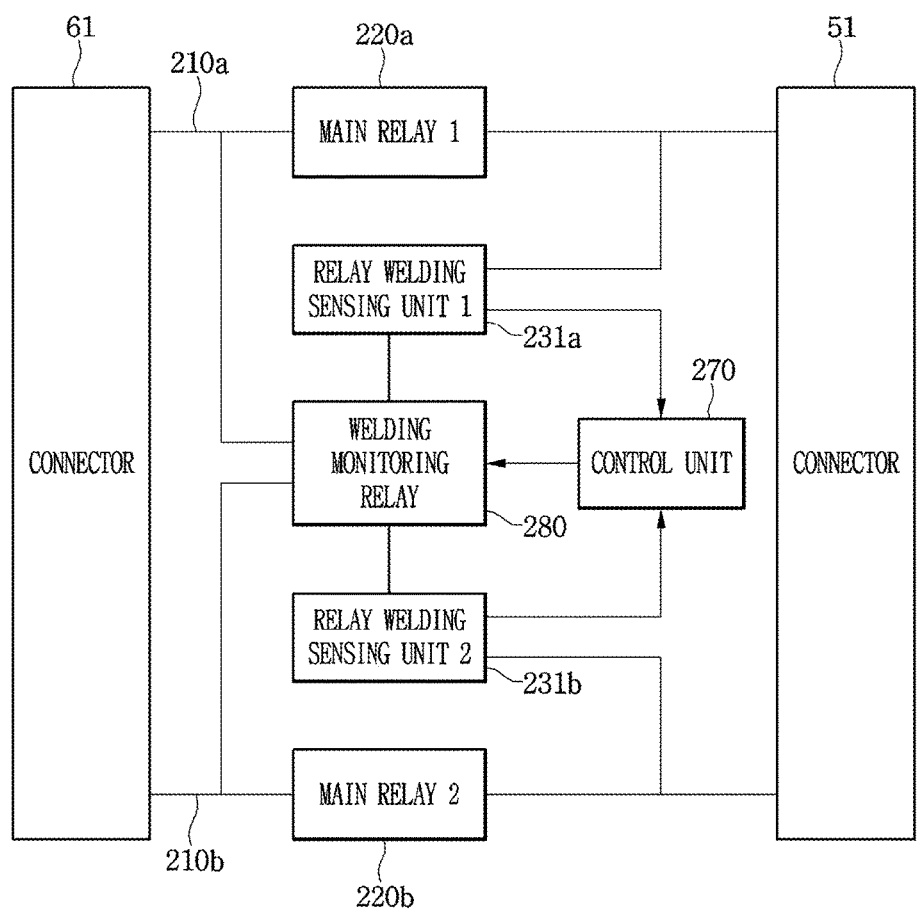
FIG. 14 is a block diagram of a welding sensing device in the charge cable assembly 20 for an EV according to the present disclosure.

FIG. 14 is a block diagram of a welding sensing device in an EV charge cable assembly 20 according to the present disclosure.

The EV charge cable assembly 20 may include a main path 210, a main relay 220, a relay welding sensing unit 231, a control unit 270, and a welding monitoring relay 280.

The main path 210 is a path through which a charge current moves from a plug to an EV. Since the charge current of the EV is mostly high current, the main path 210 may be designed so that it is possible to transmit the high current. The main path 210 includes two main paths 210a and 210b because it uses an AC current.

The main relay 220 is a kind of a switch coupled to the intermediate portion of the main path 210. When the main relay 220 opens or closes, it is possible to control the charge of the EV 100. In particular, if the main relay 220 opens, the main path 210 is in a disconnected state and thus the charge of the EV is not performed. Likewise, if the main relay 220 closes, the main path 210 is in a connected state and thus the plug 30 is connected to the EV 100 so that the charge is performed.

The main relays 220 may be coupled to the main paths 210, respectively. The main relay 220 may be one of an electrical switch and a physical switch.

The relay welding sensing unit 231 senses the presence or absence of the welding of the main relay 220. It crosses the main path 210 connected to the front and rear ends of the main relay to be connected thereto to sense the presence or absence of the welding of the main relay 220.

In particular, when the charge is ended, the main relay 220 opens. However, welding indicating that the main relay does not open but still has a close state may occur due to magnetic field by high current or high temperature. In this case, since current continues to be supplied to the EV 100 despite the completion of the charge, there may be a problem due to over-charge.

In an embodiment, it is assumed that the main relay 1 220a has been welded. If the main relay 1 220a has been welded, the main relay 1 220a has a close state and the main relay 2 220b has an open state. In this case, the main path 2 is disconnected and thus current does not flow therethrough, but the main path 1 still has a connected state and thus current continues to flow therethrough.

Thus, in a normal state, the main relay 1 220a opens and thus current flows only through the relay welding sensing unit 231a and not through the main path 1 210a, but when the main relay 1 220a closes due to welding, the current mostly flows through the main path 1 210a having low resistance. Based on the above-described normal operation and other operations, the relay welding sensing unit 231 senses the welding of the main relay 220.

The relay welding sensing unit 231 may include a photo coupler in an embodiment. The photo coupler indicates an electrical element which has both light emission and reception units electrically insulated and in which a signal is transmitted by light. In principle, when a signal is input to a light-emitting diode in the photo coupler, light is emitted and, when the light enters a photo transistor receiving the light, there is a conductive state. The photo coupler has one direction. The photo coupler may include the light emission unit that emits light when current flows, and the light reception unit that receives the light from the light emission unit and changes the received light to an electrical signal.

Thus, when the main relay 220 opens, current flows to the photo coupler and the light emission unit emits light, and on the contrary, when the main relay 220 closes, the current mostly flows to the main path and not to the photo coupler and thus does not flow to the photo coupler, so the light emission unit does not emit light. The light reception unit in the photo coupler receives a change in the light emission unit as a signal and transmits the signal to the control unit 270. In particular, the light reception unit receives light from the light emission unit, changes the light received from the light emission unit to an electrical signal and transmits the electrical signal to the control unit 270.

The welding monitoring relay 280 is connected to the relay welding sensing unit 1 and relay welding sensing unit 2 231*a* and 231*b*. In particular, the welding monitoring relay 280 is connected to the front end of each main relay 220, and the welding monitoring relay 280 is connected to the relay welding sensing unit 231 connected to the rear end of each main relay 220. The welding monitoring relay 280 may include a separate relay for each relay welding sensing unit.

The welding monitoring relay 280 controls a relay by the control of the control unit 270. Also, the welding monitoring relay 280 may supplement an insufficient withstanding voltage of the relay welding sensing unit 231.

The control unit 270 controls the overall operations related to welding sensing. In particular, it is possible to control the open and close of the welding monitoring relay 280 based on determination on whether to charge. Also, it is possible to receive a report on the presence or absence of welding from the relay welding sensing unit 231 to perform further control. Moreover, the control unit 270 may control the open or close of a main relay based on a signal related to charge.

In the following, the welding sensing process of the EV charge cable assembly 20 is described in detail with reference to FIG. 15.

Figure 15:
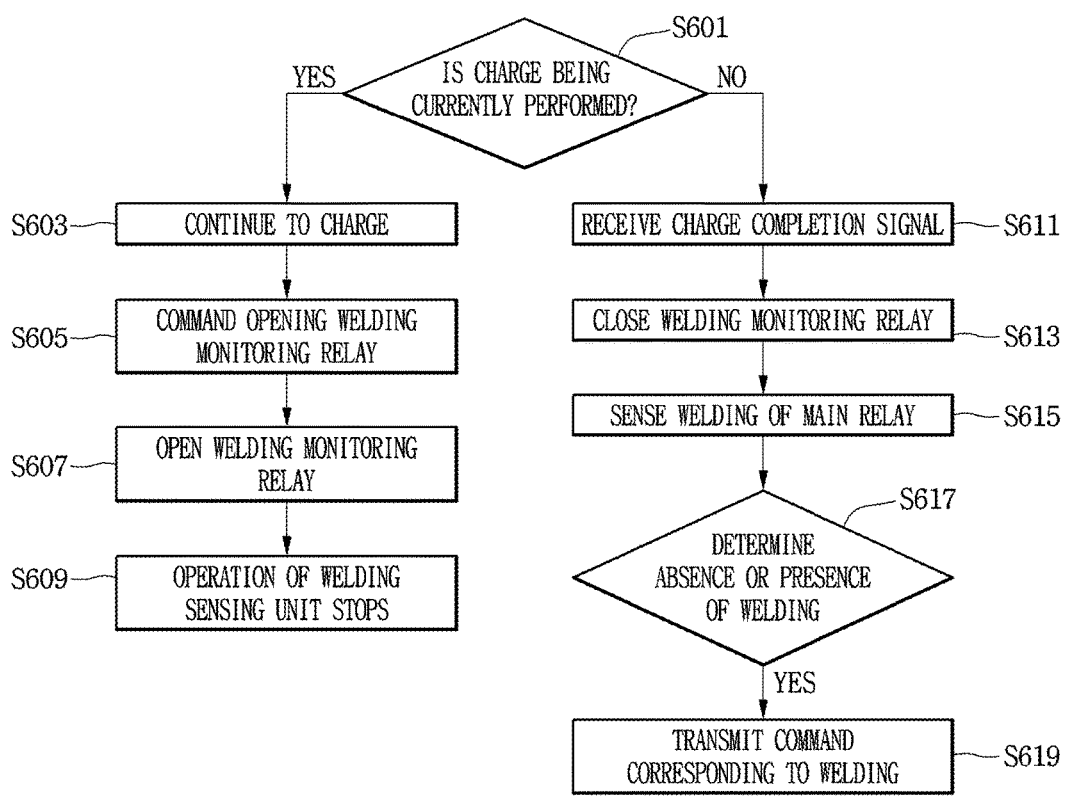
FIG. 15 is a flowchart of a process of sensing the presence or absence of welding through a welding monitoring relay 280 in the charge cable assembly 20 for an EV.

FIG. 15 is a flowchart of a process of sensing the presence or absence of welding through a welding monitoring relay 280 in an EV charge cable assembly 20.

A control unit 270 determines whether to charge an EV 100 through the EV charge cable assembly 20 in step S601. Since algorithms related to a charge start and a charge end have been already described in FIG. 11, their detailed descriptions are omitted.

If it is determined that the EV 100 is being currently charged, the control unit 270 continues to perform charge in step S603. The charge process has been already described in FIG. 11 as well.

The control unit 270 commands the open of the welding monitoring relay 280 while the charge is being performed. In an embodiment, when the control unit 270 receives a signal related to the charge start, it is possible to transmit a signal opening a relay to the welding monitoring relay 280. A charge start state indicates a state in which a main relay 220 closes for the charge of the EV 100, in which case there is no need to sense the presence or absence of welding. In particular, if the main relay 200 closes for charge, there is no need to sense the presence or absence of welding because the relay has not abnormally closed.

By the command of the control unit 270, the welding monitoring relay 280 opens in step S607. In an embodiment, the welding monitoring relay 280 may include a separate relay for each relay welding sensing unit 231. The control unit 270 opens all relays of the welding monitoring relay 280.

With the open of the welding monitoring relay 280, the operation of the relay welding sensing unit 231 stops in step S609. In particular, since power supply is cut off with the disconnection of a path connected to the relay welding sensing unit 231, the operation of the relay welding sensing unit 231 stops. As a result, it is possible to minimize unnecessary power consumption for the relay welding sensing unit 231. Also, it is possible to extend the life of a related device by minimizing a time for which the relay welding sensing unit 231 is exposed to high current for the charge of an EV.

On the contrary, a case where the EV 100 is not being charged is described below.

The control unit 270 receives a charge completion signal in step S611. Since a charge completion algorithm has also been described in FIG. 11, its description is omitted in this section.

The control unit 270 receives the charge completion signal, opens the main relay 220 and closes the welding monitoring relay 280 in step S613. When the main relay 220 opens, the main path 210 is disconnected and thus power supply to the EV 100 is cut off. If the main relay still closes despite charge completion, the battery pack of the EV is over-charged and thus it is possible to decrease the efficiency of the battery pack and cause a fault due to overheating.

The control unit 270 opens the main relay 220 and simultaneously closes the welding monitoring relay 280. In an embodiment, it is possible to first open the main relay 220 and then the welding monitoring relay 280. The reason is that there is a need to determine the presence or absence of the welding of the main relay 220, when charge has been completed and thus the main relay 220 needs to open. In particular, there may be a case where the main relay 220 needs to open but continues to maintain a close state.

When the control unit 270 closes the welding monitoring relay 280, power is supplied to a relay welding sensing unit 231 connected to the welding monitoring relay 280. Thus, the welding monitoring sensing unit 231 may sense the presence or absence of the welding of the main relay 220.

The relay welding sensing unit 231 senses the presence or absence of the welding of the main relay 220 in step S615. Although the control unit 270 has commanded the main relay to open due to charge completion, the main relay 220 may still close, not open. This situation may occur because a portion of a relay melts by heat generated by high current passing through the relay and thus relays adhere to each other. Also, magnetic field is generated by the pass of the high current, so welding may occur by the attractive force of electromagnetic field.

In particular, when the main relay 220 has to open due to charge completion but closes, a current may mostly flow to the main relay 220 having a relatively smaller resistance than the relay welding sensing unit. In this case, less current may flow than the amount of current that should flow when the main relay 220 normally opens. The relay welding sensing unit 231 senses a change in the amount of current as described above and senses the presence or absence of welding.

In an embodiment, the relay welding sensing unit 231 may sense the presence or absence of welding through a photo coupler. The photo coupler may include a light emission unit receiving an electrical signal and emitting light, and a light reception unit generating an optical signal from the light emission unit and transmitting the generated optical signal. Thus, it is possible to convert current passing through the relay welding sensing unit 231 into an optical signal and transmit a corresponding optical signal to the control unit 270 through the light reception unit.

The control unit 270 determines the presence or absence of the welding of the main relay 220 based on the signal received from the relay welding sensing unit 231. The presence or absence of the welding may be determined according to a change in signal transmitted from the relay welding sensing unit 231. For example, if the intensity of a signal transmitted from the relay welding sensing unit when the main relay 220 normally opens is 10 but the intensity of a signal actually transmitted is 5, it is possible to determine that the wedding of the main relay 220 has occurred.

When it is determined that the main relay 220 has welding, the control unit 270 transmits a command corresponding to the welding to each component in step S619. For example, it is possible to transmit a command opening the main relay 220 through other processes. As another example, there may be a method of urgently disconnecting a circuit in a charging apparatus. If welding occurs, an appropriate action is needed because current continues to be supplied to the EV and thus it is possible to break the EV.

The present disclosure differently operates the welding sensing unit determining the presence or absence of welding in the EV charge cable assembly when charge is and not performed, thereby blocking power from becoming unnecessarily consumed.

Also, the present disclosure supplements a withstanding voltage insufficient only with the welding sensing unit in the charge cable using high current, thereby further ensuring electrical stability.

According to an embodiment, the above-described method may also be embodied as processor readable codes on a program-recorded medium. Examples of the processor readable medium are a ROM, a RAM, a CD-ROM, a magnetic tape, a floppy disk, and an optical data storage device, and the method is also implemented in the form of a carrier wave (such as data transmission through the Internet).

The above-described charger is not limited to the configuration and method of described embodiments, and some or all of the embodiments may also be selectively combined so that various variations may be implemented.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging apparatus comprising:
    a main relay forming a connection between an electric vehicle (EV)-side connector and an outlet-side connector;
    a relay welding sensing unit connected to the main relay to sense the presence or absence of welding of the main relay;
    a welding monitoring relay connecting a first end of the relay welding sensing unit to a first end of the main relay; and
    a control unit controlling opening and closing of the welding monitoring relay, and
    determining whether the main relay has welding,
    wherein the main relay comprises a first main relay and a second main relay,
    wherein the relay welding sensing unit comprises a first relay welding sensing unit and a second relay welding sensing unit,
    wherein the welding monitoring relay comprises a first relay connected to the first relay welding sensing unit and a second relay connected to the second relay welding sensing unit,
    wherein a front end of the first main relay connects to a first end of the first relay, a second end of the first relay connects to a first end of the first relay welding sensing unit, and a second end of the first relay welding sensing unit connects to a rear end of the second main relay,
    wherein a front end of the second main relay connects to a first end of the second relay, a second end of the second relay connects to a first end of the second relay welding sensing unit, and a second end of the second relay welding sensing unit connects to a rear end of the first main relay,
    wherein the control unit controls the opening and closing the welding monitoring relay by opening the welding monitoring relay during charging of the electric vehicle and closing the welding monitoring relay when the charging is completed,
    wherein the control unit disconnects a circuit in a charging apparatus, when welding occurs.

2. The charging apparatus according to claim 1, wherein the control unit determines that the main relay has welding, if it is sensed that the charge of the EV is ended but the main relay is still closed.

3. The charging apparatus according to claim 2, wherein the relay welding sensing unit determines whether the main relay has welding, based on the amount of current passing through the relay welding sensing unit.

4. The charging apparatus according to claim 3, wherein the relay welding sensing unit determines whether the main relay has welding, based on the amount of current passing through the relay welding sensing unit in a normal state.

5. The charging apparatus according to claim 1, wherein the relay welding sensing unit comprises a photo coupler.

6. The charging apparatus according to claim 5, wherein the photo coupler comprises a light emission unit emitting light when current flows, and a light reception unit receiving light from the light emission unit to change the received light to an electrical signal.

* * * * *